United States Patent
Thompson et al.

(10) Patent No.: US 7,036,883 B1
(45) Date of Patent: May 2, 2006

(54) POWER OPERABLE VEHICLE SEAT ASSEMBLY

(76) Inventors: James L. Thompson, 2136 E. Cook Rd., Grand Blanc, MI (US) 48439; Wendy K. Thompson, 2136 E. Cook Rd., Grand Blanc, MI (US) 48439

( * ) Notice: Subject to any disclaimer, the term of this patent is extended or adjusted under 35 U.S.C. 154(b) by 0 days.

(21) Appl. No.: 10/922,557

(22) Filed: Aug. 23, 2004

(51) Int. Cl.
*B60N 2/00* (2006.01)

(52) U.S. Cl. ................................ 297/344.24
(58) Field of Classification Search ......... 297/344.24; 248/416, 425
See application file for complete search history.

(56) References Cited

U.S. PATENT DOCUMENTS

| | | | |
|---|---|---|---|
| 2,290,464 A * | 7/1942 | Buchheit | 296/65.07 |
| D259,457 S | 6/1981 | Smith et al. | |
| 4,600,239 A | 7/1986 | Gerstein et al. | |
| 4,802,706 A | 2/1989 | Onimaru et al. | |
| 4,846,529 A | 7/1989 | Tulley | |
| 5,524,952 A * | 6/1996 | Czech et al. | 296/65.12 |
| D396,152 S | 7/1998 | Beermann et al. | |
| 6,024,398 A | 2/2000 | Horton et al. | |
| 6,027,170 A * | 2/2000 | Benz et al. | 297/344.21 |
| 6,572,172 B1 | 6/2003 | Ninomiya et al. | |

* cited by examiner

*Primary Examiner*—Milton Nelson, Jr.

(57) ABSTRACT

A selectively rotatable vehicle seat assembly includes a vehicle seat having lower and back portions. The lower portion has a bottom surface positionable medially of a pair floor runner supports. A chair mount is connected to the bottom surface and includes elongated guide posts and a central shaft. The assembly further includes a power mechanism for rotating the vehicle seat and a support plate slidably positionable between extended and retracted positions. The support plate includes rollers spaced along opposed edge portions thereof and grooves extending along a partial length thereof. Such posts and shaft include flange portions prohibiting vertical movement of the chair mount. A base member, secured adjacent to the floor runner supports, includes upper and lower portions. The upper portion further includes oppositely spaced channels for directing the rollers therealong.

15 Claims, 4 Drawing Sheets

POWER OPERABLE VEHICLE SEAT ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a vehicle seat and, more particularly, to a power operable vehicle seat assembly for assisting a user to readily enter and exit a vehicle.

2. Prior Art

The use of vehicle seats is known in the prior art. More specifically, vehicle seats heretofore devised and utilized are known to consist basically of familiar, expected and obvious structural configurations, notwithstanding the myriad of designs encompassed by the crowded prior art which have been developed for the fulfillment of countless objectives and requirements.

Presently-used vehicular seats, such as the conventional car passenger seat in the automobile, are not well-equipped to accommodate persons for whom there is considerable difficulty in seating himself or herself on the seat and getting up from the seat when exiting from the vehicle. So-called swivel seats have been known for a long time, but these typically consist of a simple vehicular seat that pivots about a vertical axis, which vertical axis may or may not be eccentrically positioned relative to the mid-plane of the seat taken from front-to-rear of the vehicle. This swiveling of the seat allows easier egress from the vehicle, since the seat faces toward the doorway of the vehicle. In some instances, especially in an offset-pivot axis, such pivotal movement toward the door would permit the seated person to implant his or her feet directly on the ground after the seat has been pivoted to face toward the door. However, these swivel seats are not meant for use by handicapped and elderly persons, but simply to serve to help one into and out of the vehicle in a faster and easier manner.

Various improvements have been made over the years, such as a rotating vehicle seat. In many cases, the passenger entry/exit assistance in such a rotating vehicle seat is performed by combining two movements, i.e., a horizontally rotating movement and a longitudinal sliding movement. In such a rotating vehicle seat with rotating and sliding mechanisms, when the rotating and sliding seat movements are performed by an operator or helper, the operator's load can become especially heavy, in particular, when a heavy person is sitting on the seat.

In order to reduce the operator's load a rotating vehicle seat that performs a rotating movement and a sliding movement of the seat by means of an electric motor has been proposed. However, in the above known rotating vehicle seat, the construction of the driving mechanism is complicated, and more space is necessary to store the driving mechanism within the vehicle. For this reason, it is difficult to use the known rotating vehicle seat in a small-sized vehicle.

Accordingly, a need remains for a power operable vehicle seat assembly to overcome the above-noted shortcomings. The present invention satisfies such a need by providing a seat assembly that is easy to install and use, and further provides convenience, safety, and comfort to the user. Such an assembly greatly improves the maneuverability of a handicapped individual by allowing them access to a vehicle that they might not have been able to access prior to installation of the seat assembly.

BRIEF SUMMARY OF THE INVENTION

In view of the foregoing background, it is therefore an object of the present invention to provide a power operable vehicle seat assembly. These and other objects, features, and advantages of the invention are provided by a selectively rotatable vehicle seat assembly for assisting a user to readily enter and exit a vehicle.

The assembly includes a vehicle seat having operably connected lower and back portions wherein the lower portion has a bottom surface provided with a longitudinal axis positionable medially of a pair of floor runner supports of the vehicle. A substantially annular chair mount is securely connected to the bottom surface and extends downwardly therefrom. Such a chair mount includes a plurality of elongated and vertically spaced guide posts extending away from the vehicle seat, and a central shaft medially disposed between the posts extending downwardly beyond respective lengths thereof. One of the posts preferably penetrates downwardly into the lower portion and another of the posts terminates medially between the lower portion and the support plate.

The assembly further includes a power mechanism for rotating the vehicle seat along linear and arcuate paths so that a user can more easily enter and exit the vehicle. The power mechanism preferably includes a motor electrically coupled to an external power source and an annular gear including a serrated outer surface rotatable in clockwise and counterclockwise directions. A toothed guide beam cooperates with the gear and directs the chair mount along a linear direction of travel during operating conditions. Such a guide beam is positioned within the lower portion of the base member.

A substantially rectangular mobile support plate is slidably positionable along a substantially orthogonal path to the axis between extended and retracted positions. Such a support plate includes a plurality of rollers selectively spaced along opposed edge portions thereof positioned outwardly from the chair mount. The support plate is provided with a plurality of grooves extending along a partial length thereof for directing the posts and the shaft therealong, thereby conveniently allowing a user to selectively position the vehicle seat between extended and retracted positions during operating conditions. Such posts and shaft include flange portions integrally disposed along respective bottom end portions thereof for effectively prohibiting vertical movement of the chair mount during operating conditions.

Preferably, selected ones of the grooves are oppositely spaced apart and have substantially arcuate shapes for guiding the chair mount along a radial path. Other ones of the grooves have rectilinear shapes for cooperating with the selected grooves so that a user may advantageously simultaneously maneuver the chair mount between the extended and retracted positions as well as the clockwise and counterclockwise positions.

A base member is secured to a selected portion of the vehicle adjacent to the floor runner supports thereof. Such a base member includes upper and lower portions for housing the support plate and the power mechanism respectively. The base member preferably includes a horizontally disposed top surface for effectively isolating the lower and upper portions. The upper portion includes oppositely spaced channels extending substantially perpendicular to the axis for effectively directing the rollers therealong. Such channels may have a substantially U-shape for conveniently assisting to maintain the support plate along a horizontal plane.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
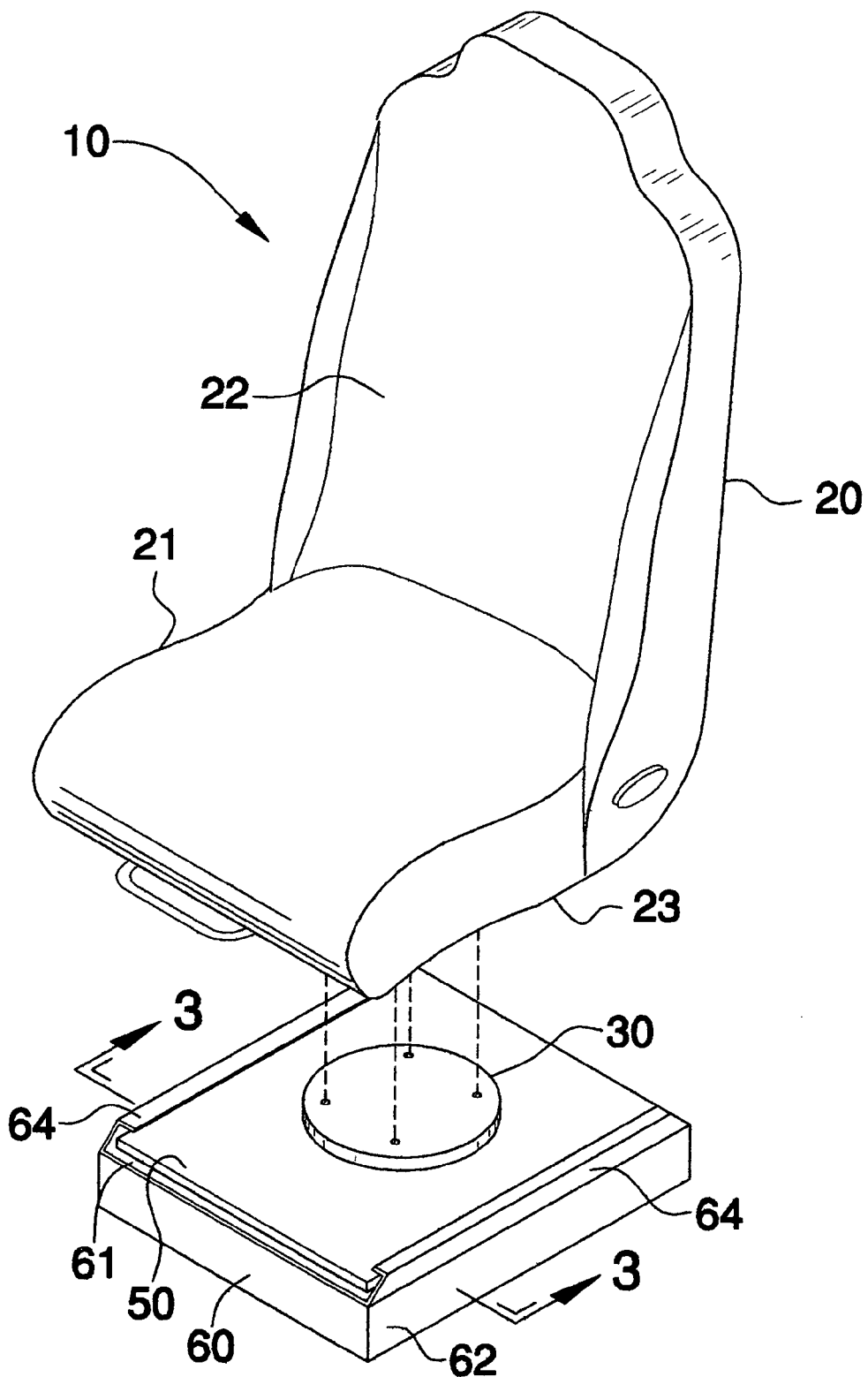
FIG. 1 is a perspective view showing a power operable vehicle seat assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–5 by the reference numeral 10 and is intended to protect a power operable vehicle seat assembly. It should be understood that the assembly 10 may be used to extend and retract many different types of seats and should not be limited to only vehicle seats.

Referring initially to FIG. 1, the assembly 10 includes a vehicle seat 20 having operably connected lower 21 and back 22 portions wherein the lower portion 21 has a bottom surface 23 provided with a longitudinal axis positionable medially of a pair of floor runner supports (not shown) of the vehicle (not shown). A substantially annular chair mount 30 is securely connected to the bottom surface 23 and extends downwardly therefrom. Such a chair mount 30 includes a plurality of elongated and vertically spaced guide posts 31 extending away from the vehicle seat 20, and a central shaft 32 medially disposed between the posts 31 extending downwardly beyond respective lengths thereof.

One of the posts 31a penetrates downwardly into the lower portion 62 and another of the posts 31b terminates medially between the lower portion 62 (described herein below) and the support plate 50 (described herein below). Such posts 31 and shaft 32 include flange portions 33 integrally disposed along respective bottom end portions 34 thereof for effectively prohibiting vertical movement of the chair mount 30 during operating conditions, as is best shown in FIGS. 3 and 4.

Figure 3:
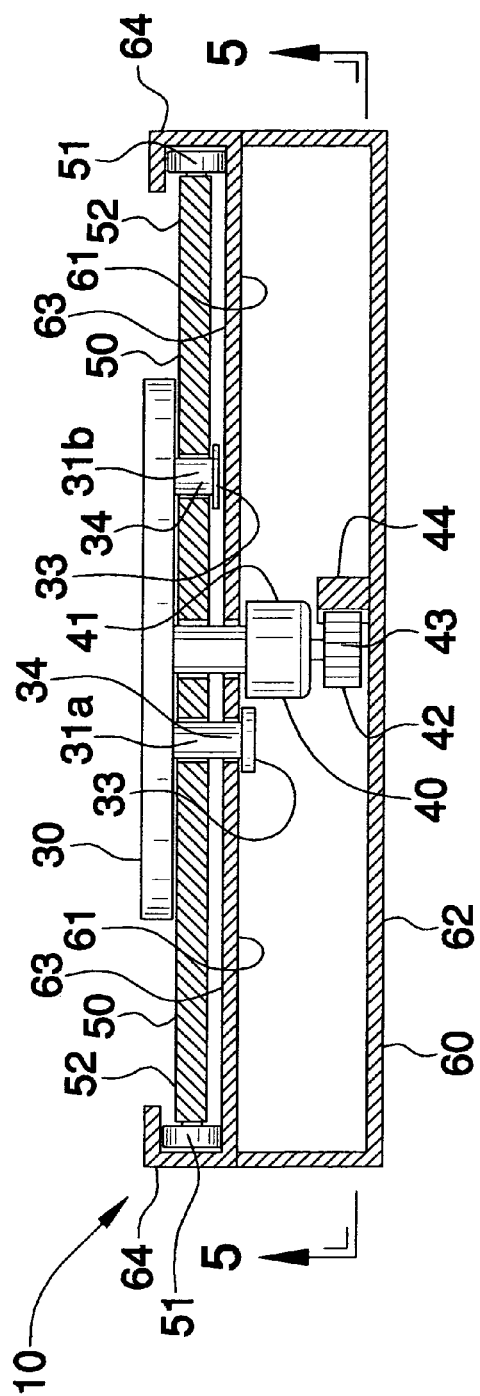
FIG. 3 is an enlarged cross-sectional view of the assembly shown in FIG. 1, taken along line 3—3.
Figure 4:
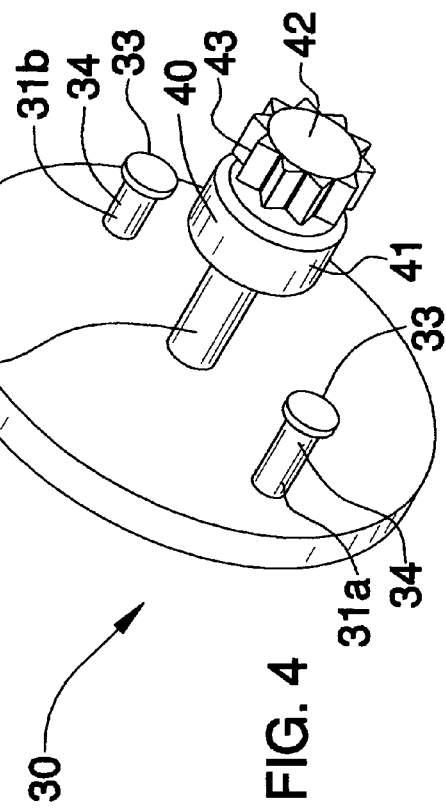
FIG. 4 is an enlarged perspective view of the chair mount shown in FIG. 2.
Figure 5:
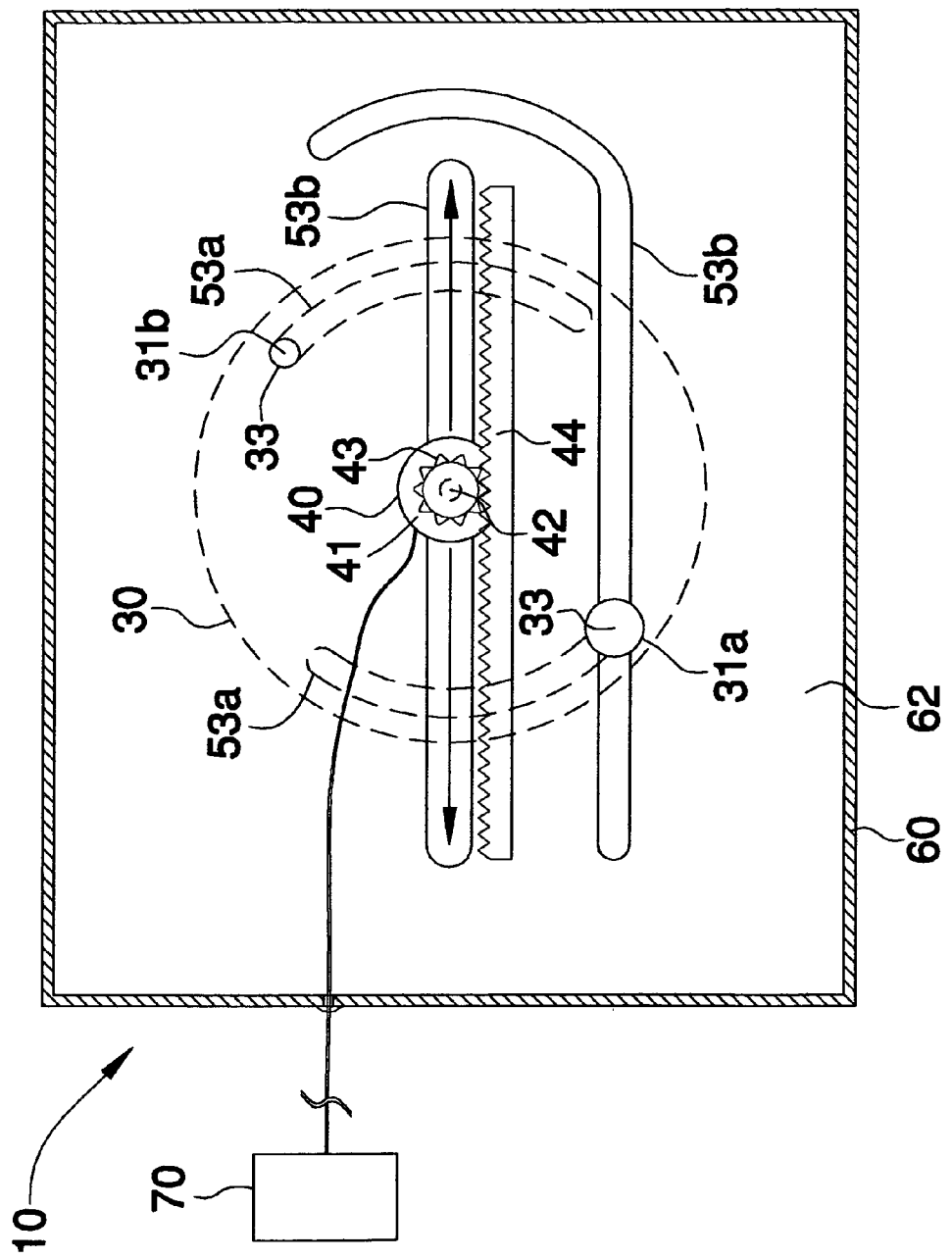
FIG. 5 is a cross-sectional view of the base member showing the plurality of grooves and toothed gear.

Referring to FIGS. 3 and 5, the assembly 10 further includes a power mechanism 40 for rotating the vehicle seat 20 along linear and arcuate paths so that a user can more easily enter and exit the vehicle. Such a power mechanism 40 advantageously eliminates the need for a handicapped person to be manually/physically assisted in exiting a vehicle, thus granting them greater independence than would normally be possible. The power mechanism 40 includes a motor 41 electrically coupled to an external power source 70 and an annular gear 42 including a serrated outer surface 43 rotatable in clockwise and counterclockwise directions, as shown in FIG. 5. A toothed guide beam 44 cooperates with the gear 42 and directs the chair mount 30 along a linear direction of travel during operating conditions. Such a guide beam 44 is positioned within the lower portion 62 of the base member 60 (described herein below), as best shown in FIG. 3.

Figure 2:
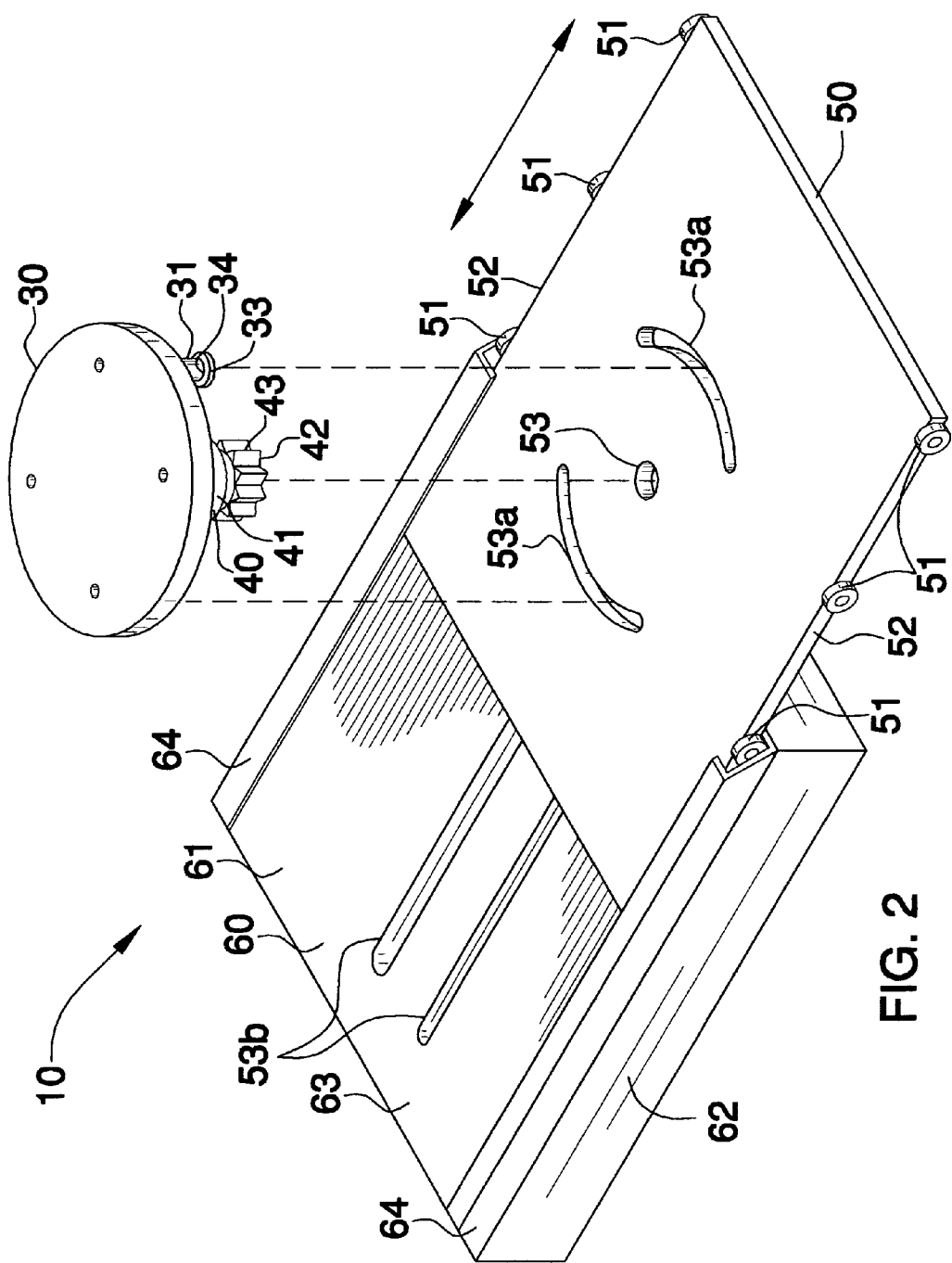
FIG. 2 is a partially exploded view of the present invention showing the chair mount disengaged from the base and support plate.

Referring to FIG. 2, a substantially rectangular mobile support plate 50 is slidably positionable along a substantially orthogonal path to the axis between extended and retracted positions. Such a support plate 50 includes a plurality of rollers 51 selectively spaced along opposed edge portions 52 thereof positioned outwardly from the chair mount 30. The support plate 50 is provided with a plurality of grooves 53 extending along a partial length thereof for directing the posts 31 and the shaft 32 therealong, thereby conveniently allowing a user to selectively position the vehicle seat 20 between extended and retracted positions during operating conditions.

Still referring to FIG. 2, selected ones of the grooves 53a are oppositely spaced apart and have substantially arcuate shapes for guiding the chair mount 30 along a radial path. Other ones of the grooves 53b have rectilinear shapes for cooperating with the selected grooves 53a so that a user may advantageously simultaneously maneuver the chair mount 30 between the extended and retracted positions as well as the clockwise and counterclockwise positions. This feature conveniently allows a user to completely exit a vehicle and gain foot support on the surface outside of the vehicle while not having to execute any physical movement, which is optimal for the handicapped and the elderly.

Still referring to FIG. 2, a base member 60 is secured to a selected portion of the vehicle adjacent to the floor runner supports thereof. Such a base member 60 includes upper 61 and lower 62 portions for housing the support plate 50 and the power mechanism 40 respectively. The base member 60 includes a horizontally disposed top surface 63 for effectively isolating the lower 62 and upper 61 portions. The upper portion 61 includes oppositely spaced channels 64 extending substantially perpendicular to the axis for effectively directing the rollers 51 therealong. Such channels 64 have a substantially U-shape for conveniently assisting to maintain the support plate 50 along a horizontal plane and advantageously prevents any unwanted pivotal movement of the support plate 50.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A selectively rotatable vehicle seat assembly for assisting a user to readily enter and exit a vehicle, said assembly comprising:
   a vehicle seat having operably connected lower and back portions wherein said lower portion has a bottom surface provided with a longitudinal axis positionable medially of a pair of floor runner supports of the vehicle;
   a chair mount securely connected to said bottom surface and extending downwardly therefrom, said chair mount comprising
      a plurality of elongated and vertically spaced guide posts extending away from the vehicle seat,
      a central shaft medially disposed between said posts and extending downwardly beyond respective lengths thereof;
   power means for rotating the vehicle seat along linear and arcuate paths so that a user can more easily enter and exit the vehicle;
   a mobile support plate being slidably positionable along a substantially orthogonal path to the axis between extended and retracted positions, said support plate comprising a plurality of rollers selectively spaced along opposed edge portions thereof and positioned outwardly from said chair mount, said support plate being provided with a plurality of grooves extending along a partial length thereof for directing said posts and said shaft therealong and thereby allowing a user to selectively position the vehicle seat between the extended and retracted positions during operating conditions; and
   a base member comprising upper and lower portions for housing said support plate and said power means respectively, said upper portion including oppositely spaced channels extending substantially perpendicular to the axis for directing said rollers therealong;
   wherein said power means comprises
      a motor electrically coupled to an external power source and an annular gear including a serrated outer surface rotatable in clockwise and counterclockwise directions; and
      a toothed guide beam for cooperating with said gear and directing said chair mount along a linear direction of travel during operating conditions, said guide beam being positioned within said lower portion of said base member.

2. The vehicle seat assembly of claim 1, wherein said base member includes a horizontally disposed top surface for isolating said lower and upper portions.

3. The vehicle seat assembly of claim 1, wherein said channels have a substantially U-shape for assisting to maintain said support plate along a horizontal plane.

4. The vehicle seat assembly of claim 1, wherein selected ones of said grooves are oppositely spaced apart and have substantially arcuate shapes for guiding said chair mount along a radial path, other ones of said grooves have rectilinear shapes for cooperating with said selected grooves so that a user may simultaneously maneuver said chair mount between the extended and retracted positions as well as the clockwise and counterclockwise positions.

5. The vehicle seat assembly of claim 1, wherein one said posts penetrates downwardly into said lower portion, another said posts terminates medially between said lower portion and said support plate.

6. A selectively rotatable vehicle seat assembly for assisting a user to readily enter and exit a vehicle, said assembly comprising:
   a vehicle seat having operably connected lower and back portions wherein said lower portion has a bottom surface provided with a longitudinal axis positionable medially of a pair of floor runner supports of the vehicle;
   a substantially annular chair mount securely connected to said bottom surface and extending downwardly therefrom, said chair mount comprising
      a plurality of elongated and vertically spaced guide posts extending away from the vehicle seat,
      a central shaft medially disposed between said posts and extending downwardly beyond respective lengths thereof;
   power means for rotating the vehicle seat along linear and arcuate paths so that a user can more easily enter and exit the vehicle;
   a substantially rectangular mobile support plate being slidably positionable along a substantially orthogonal path to the axis between extended and retracted positions, said support plate comprising a plurality of rollers selectively spaced along opposed edge portions thereof and positioned outwardly from said chair mount, said support plate being provided with a plurality of grooves extending along a partial length thereof for directing said posts and said shaft therealong and thereby allowing a user to selectively position the vehicle seat between the extended and retracted positions during operating conditions; and
   a base member comprising upper and lower portions for housing said support plate and said power means respectively, said upper portion including oppositely spaced channels extending substantially perpendicular to the axis for directing said rollers therealong;
   wherein said power means comprises
      a motor electrically coupled to an external power source and an annular gear including a serrated outer surface rotatable in clockwise and counterclockwise directions, and
      a toothed guide beam for cooperating with said gear and directing said chair mount along a linear direction of travel during operating conditions, said guide beam being positioned within said lower portion of said base member.

7. The vehicle seat assembly of claim 6, wherein one said posts penetrates downwardly into said lower portion, another said posts terminates medially between said lower portion and said support plate.

8. The vehicle seat assembly of claim 6, wherein said base member includes a horizontally disposed top surface for isolating said lower and upper portions.

9. The vehicle seat assembly of claim 6, wherein said channels have a substantially U-shape for assisting to maintain said support plate along a horizontal plane.

10. The vehicle seat assembly of claim 6, wherein selected ones of said grooves are oppositely spaced apart and have substantially arcuate shapes for guiding said chair mount along a radial path, other ones of said grooves have rectilinear shapes for cooperating with said selected grooves so that a user may simultaneously maneuver said chair mount between the extended and retracted positions as well as the clockwise and counterclockwise positions.

11. A selectively rotatable vehicle seat assembly for assisting a user to readily enter and exit a vehicle, said assembly comprising:
   a vehicle seat having operably connected lower and back portions wherein said lower portion has a bottom surface provided with a longitudinal axis positionable medially of a pair of floor runner supports of the vehicle;
   a substantially annular chair mount securely connected to said bottom surface and extending downwardly therefrom, said chair mount comprising
      a plurality of elongated and vertically spaced guide posts extending away from the vehicle seat,
      a central shaft medially disposed between said posts and extending downwardly beyond respective lengths thereof;
   power means for rotating the vehicle seat along linear and arcuate paths so that a user can more easily enter and exit the vehicle;
   a substantially rectangular mobile support plate being slidably positionable along a substantially orthogonal path to the axis between extended and retracted positions, said support plate comprising a plurality of rollers selectively spaced along opposed edge portions thereof and positioned outwardly from said chair mount, said support plate being provided with a plurality of grooves extending along a partial length thereof for directing said posts and said shaft thereal ong and thereby allowing a user to selectively position the vehicle seat between the extended and retracted positions during operating conditions, said posts and said shaft including flange portions integrally disposed along respective bottom end portions thereof for prohibiting vertically movement of said chair mount during operating conditions; and
   a base member comprising upper and lower portions for housing said support plate and said power means respectively, said upper portion including oppositely spaced channels extending substantially perpendicular to the axis for directing said rollers therealong;
   wherein said power means comprises
      a motor electrically coupled to an external power source and an annular gear including a serrated outer surface rotatable in clockwise and counterclockwise directions, and
      a toothed guide beam for cooperating with said gear and directing said chair mount along a linear direction of travel during operating conditions, said guide beam being positioned within said lower portion of said base member.

12. The vehicle seat assembly of claim 11, wherein selected ones of said grooves are oppositely spaced apart and have substantially arcuate shapes for guiding said chair mount along a radial path, other ones of said grooves have rectilinear shapes for cooperating with said selected grooves so that a user may simultaneously maneuver said chair mount between the extended and retracted positions as well as the clockwise and counterclockwise positions.

13. The vehicle seat assembly of claim 11, wherein one said posts penetrates downwardly into said lower portion, another said posts terminates medially between said lower portion and said support plate.

14. The vehicle seat assembly of claim 11, wherein said base member includes a horizontally disposed top surface for isolating said lower and upper portions.

15. The vehicle seat assembly of claim 11, wherein said channels have a substantially U-shape for assisting to maintain said support plate along a horizontal plane.

* * * * *